United States Patent
Hudson et al.

(12) 
(10) Patent No.: US 10,402,921 B2
(45) Date of Patent: Sep. 3, 2019

(54) NETWORK COMPUTER SYSTEM FOR QUANTIFYING CONDITIONS OF A TRANSACTION

(71) Applicant: Auction.com, LLC, Irvine, CA (US)

(72) Inventors: James Hudson, San Jose, CA (US); Nathaniel Dever, Rancho Santa Margarita, CA (US)

(73) Assignee: Auction.com, LLC, Irvine, CA (US)

( * ) Notice: Subject to any disclaimer, the term of this patent is extended or adjusted under 35 U.S.C. 154(b) by 457 days.

(21) Appl. No.: 14/720,675

(22) Filed: May 22, 2015

(65) Prior Publication Data

US 2016/0343052 A1 Nov. 24, 2016

(51) Int. Cl.
*G06Q 30/00* (2012.01)
*G06Q 50/16* (2012.01)
*G06Q 30/06* (2012.01)
*G06Q 30/08* (2012.01)

(52) U.S. Cl.
CPC ......... *G06Q 50/16* (2013.01); *G06Q 30/0611* (2013.01); *G06Q 30/0619* (2013.01); *G06Q 30/0641* (2013.01); *G06Q 30/08* (2013.01)

(58) Field of Classification Search
CPC .......... G06Q 30/06; G06Q 30/0601–30/0643; G06Q 30/08; G06Q 50/16; G06Q 50/0167
See application file for complete search history.

(56) References Cited

U.S. PATENT DOCUMENTS

| | | | |
|---|---|---|---|
| 6,058,379 A | 5/2000 | Odom | |
| 6,185,599 B1 | 2/2001 | Salimando | |
| 6,502,113 B1 | 12/2002 | Crawford | |
| 6,684,196 B1 | 1/2004 | Mini | |
| 6,813,612 B1 | 11/2004 | Rabenold | |
| 7,353,183 B1 | 4/2008 | Musso | |
| 7,617,145 B1 | 11/2009 | Peterson | |
| 2002/0178069 A1* | 11/2002 | Walker | G06Q 20/208 705/23 |
| 2005/0240511 A1* | 10/2005 | Chadwick | G06Q 10/06 705/37 |
| 2006/0190386 A1 | 8/2006 | Levy | |
| 2007/0211876 A1 | 9/2007 | Othmer | |
| 2007/0299766 A1* | 12/2007 | Bril | G06Q 30/08 705/37 |
| 2008/0071634 A1 | 3/2008 | Rampell et al. | |
| 2008/0103883 A1* | 5/2008 | Szybalski | G06Q 30/02 705/14.13 |
| 2008/0294543 A1* | 11/2008 | Shebby | G06Q 30/08 705/37 |
| 2009/0006117 A1 | 1/2009 | Shapiro | |
| 2009/0112726 A1 | 4/2009 | Miller | |
| 2012/0084169 A1 | 4/2012 | Adair | |

(Continued)

OTHER PUBLICATIONS

International Search Report and Written Opinion dated Aug. 31, 2016, PCT Application No. PCT/US2016/033802, 9 pages.

(Continued)

*Primary Examiner* — William J Allen
(74) *Attorney, Agent, or Firm* — Mahamedi IP Law LLP

(57) ABSTRACT

Examples described herein pertain generally to network computer systems, and more specifically, to network computer systems for evaluating contingency based outcomes for network transactions.

19 Claims, 6 Drawing Sheets

(56) References Cited

U.S. PATENT DOCUMENTS

| | | | |
|---|---|---|---|
| 2012/0290485 A1* | 11/2012 | Ozonat | G06Q 10/06375 |
| | | | 705/80 |
| 2013/0103592 A1* | 4/2013 | Shenk | G06O 30/0607 |
| | | | 705/80 |
| 2013/0218708 A1 | 8/2013 | Finkelstein | |
| 2014/0236751 A1 | 8/2014 | Bloomfield | |
| 2014/0289065 A1 | 9/2014 | Gladis et al. | |
| 2016/0071178 A1* | 3/2016 | Perriello | G06Q 30/0611 |
| | | | 705/26.4 |

OTHER PUBLICATIONS

Rischpater, R. (2004). Ebay Application Development. Apress. 321 pages.

\* cited by examiner

Stoneview Office Building | Lowrise Office | List Price | Competitive Offers | Submit Offer
3001 Lava Ridge Court | 108,354 Sq.Ft. | $3,500,000
Roseville, CA 95661 | 74.5% Occupied

Competitive Offers

Offeror #4     $3,350,000
Placed: 3/20/2015    Offer Terms ▼ — 420

Offeror #2     $3,100,000
Placed: 2/17/2015    Offer Terms ▼

Offeror #3     $3,125,000
Placed: 3/14/2015    Offer Terms ▼

Offeror #1     $3,500,000
Placed: 2/5/2015     Offer Terms ▼

Submit Offer

*FIG. 4B*

NETWORK COMPUTER SYSTEM FOR QUANTIFYING CONDITIONS OF A TRANSACTION

TECHNICAL FIELD

Examples described herein pertain generally to a network computer system, and more generally, a network computer system to quantify conditions of a transaction.

BACKGROUND

Network computer systems increasingly have application in numerous service fields. Such computer systems can maintain large sets of data, and additionally utilize large data sets for determining various kinds of metrics.

BRIEF DESCRIPTION OF THE DRAWINGS

FIG. 4B illustrates an example of feedback that a user can receive for listing, the example indicating a likelihood that the bidder's offer will succeed and the contingencies will resolve favorably if the offer is received.

DETAILED DESCRIPTION

Figure 1:
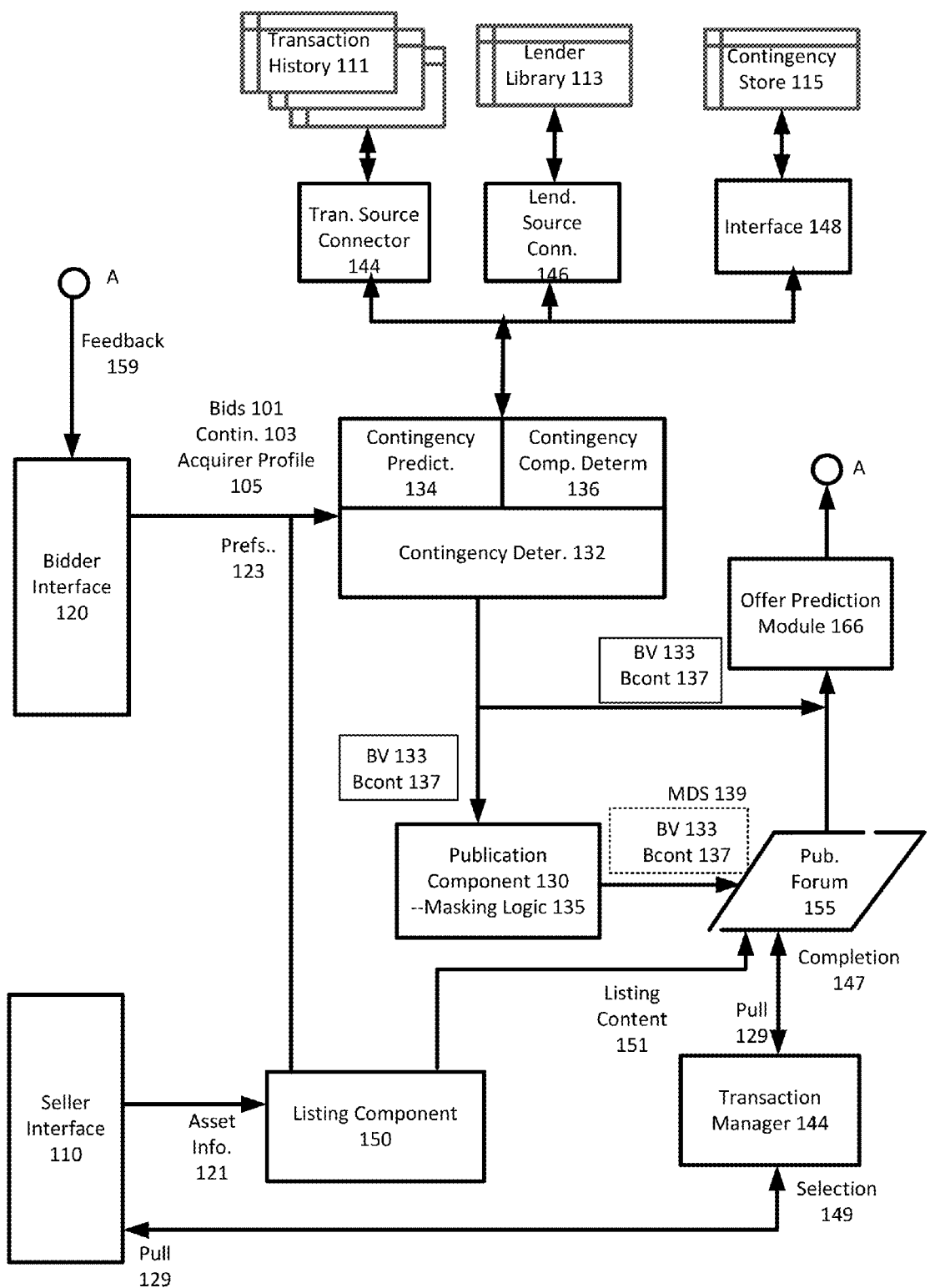
FIG. 1 illustrates a network computer system for predicting contingency outcomes, according to an embodiment.

Examples described herein pertain generally to network computer systems, and more specifically, to network computer systems for predicting contingency outcomes.

Examples described herein pertain generally to network computer systems, and more specifically, to network computer systems for evaluating contingency-based outcomes for network transactions.

According to some examples, a computer system and method are provided to process an offer from an interested party for a given item of transaction. An offer value and a set of contingencies can be identified from the offer. The set of contingencies can specify a set of a contemporaneous or future events related to the transaction for which an outcome is uncertain. A set of offer submission parameters can be determined which include at least an offer value and a contingency parameter. The contingency parameter may provide a quantified representations of a corresponding contingency in the set of contingencies. The offer can be evaluated based on (i) the bid value and (ii) a comparison of the contingency parameter with a corresponding value reflecting a seller preference for the contingency.

According to examples described, a computer system implements an online forum where offer for the sale of a real estate asset can be maintained. In one implementation, a system includes an interface to enable bidders to submit offers for a transaction of a real estate asset. Each offer received through the interface, can be processed to (i) identify a value of the offer, and (ii) identify a set of contingencies associated with the offer. For each offer, a likelihood is determined as to whether the set of contingencies associated with the offer will resolve in favor of completing the transaction should the offer be accepted. The offer can be published for at least a group of users, including multiple users who select to view information about or participate in the transaction. Additionally, for each offer, a corresponding indication can be displayed or rendered regarding the likelihood that the offer will resolve in favor of completing the transaction along with the published offer, so that multiple offers are published with the corresponding indication.

The term "contingency" refers to a contemporaneous or future event or condition for which an outcome is uncertain. In the context of transactions, "contingencies" refers to terms specified by a buyer, seller or which may be inherent in the nature of the transaction, which represent conditions that have to occur for a transaction to "close". Real estate transactions in particular, are generally characterized by a two-step process in which a seller and buyer first agree to terms, then after agreement is reached, work through a closing process where contingencies of the transaction are resolved. The contingencies of individual transactions can vary depending on a variety of factors, and on occasion, the contingencies cause the transaction to fail. In many cases, sellers of real estate assets are wary of bidders whom are perceived to carry risk of specifying offers which have contingencies that cannot be resolved and thus cause the offer to fail.

Among other benefits, some examples publish offers and corresponding contingencies, without displaying personal information about the bidder that would allow for discrimination or subjective bidder evaluation. Moreover, some variations provide for a bidding process that is transparent, in that the participating bidders or users are shown the amounts of the other bids, as well a score or other quantitative metric or representation which reflect a predicted outcome for contingencies which accompany the corresponding bid.

For purpose of described examples, the term "user" or "users" is intended to mean a purchasing entity. While the term "user" can refer to person, the term "user" can also refer to a legal entity, such as a corporation or partnership.

As used herein, an "real-property asset" can refer to different types of real estate property, such as a single family residence, a condominium, an apartment, a commercial property, a parcel of land, or a note (e.g., mortgage).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples of the invention can be carried and/or executed. In particular, the numerous machines shown with examples of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates a network computer system for predicting contingency outcomes in context of a transaction, according to one or more embodiments. Embodiments such as described with FIG. 1 can be implemented for a variety of different kinds of transactions, including transactions in which an item is required to "close" (e.g., real-estate, art), or when one or more conditions specified with the transaction require completion after the transaction is agreed upon (e.g., agreement is to amount of transaction) by the involved parties. In this regard, the transaction can be for the exchange or transfer of a variety of different kinds of tangible and intangible items. The contingencies which accompany the transaction can also include or depend on actions that either a seller, purchaser, or third-party performs or causes. Still further, some variations can provide for transactions which are categorized by (i) transfer of legal title, or (ii) transfer of possession or some other right other than legal title to an item (e.g., lease for real-estate). In some applications, the contingencies include conditions which are met after an agreement is reached by the acquiring and transferring parties, and the conditions can include or rely upon facets such as (i) actions taken by one or both parties during or after the transaction, (ii) financial capability or profile of one or both parties, and/or (iii) actions or results provided by third-parties (e.g., credit authorization authority, appraisal, loan authority) in connection with the transaction. In this respect, contingencies can, depending on the nature of the item being transferred and the transaction, include or depend on events (or results from events) which occur during and/or after the agreement for the transfer of the item is made. In many cases, the contingencies which accompany the transfer include "terms" of sale or transfer for an item.

There are many types of transactions which are accompanied by contingencies. In many instances, the use of an online medium to conduct a transaction can itself necessitate contingencies which must be cleared before the transaction is cleared. For example, online exchanges for motor vehicles can involve activities that occur after agreement is reached by buyer and seller, including (i) vehicle inspection (sometimes by third-party), (ii) title check, (iii) production of original title from seller, and (iv) deposit or transfer of funds from the buyer to seller within a set time period. As another example, in a transaction for fine art, jewelry or collectibles, the transaction can include contingencies provided through activities such as appraisal or authentication, and verification of funds. Examples described herein enable evaluation, comparison, and/or scoring of contingencies which can be separately identified from the exchanged value of the transaction.

Many examples described herein provide for transactions in which real-estate is transferred through an online medium. With reference to an example of FIG. 1, the parties interested in purchasing the real-estate are referred to bidders. In variations, the item of real-estate can extend to various types of real-property and real-property interests, including those for the legal transfer of residential or commercial property, as well as the transfer of notes or mortgages for real-property.

In other variations, the legal right being transferred is for the right of possession. In the case of real-property, for example, a system such as described with an example of FIG. 1 provides for transfer of a lease, such as a long-term commercial lease or even a rental period (e.g., vacation period).

With reference to an example of FIG. 1, a network computer system 100 can be implemented by, for example, one or more servers that communicate on a network to a group of client terminals. In variations, the network computer system 100 can be implemented using, for example, one or more terminals that operate as peers on a shared computing environment. The network computer system 100 can be provided in a variety of computer environments and context. By way of example, the network computer system 100 can be implemented for an auction forum, where individual bidders can use the network computer system 100 to evaluate their offers (or "bids" in the context of FIG. 1), such as by way of improving their bid and/or comparing their bid to other bids. In variations, the network computer system 100 can be implemented in an online listing forum, such as provided by a real estate listing website. By way of example, system 100 can be implemented as an auction process, or alternatively, as a bid (or offer submission) forum.

With further reference to an example of FIG. 1, system 100 includes a seller interface 110, an offer interface 120, an offer publication component 130, a contingency parameter determination component 132, and a listing component 150. As described with some examples, the components of system 100 can combine to publish a listing 105 for a real estate asset on an online forum 155 (e.g., web page). By way of example, the online forum 155 can be hosted by an Internet or network-based service where real estate assets are advertised and/or offered for sale. For example, online forum 155 can correspond to an auction webpage, provided at an auction website. In variations, online forum 155 can display a real estate which includes links and other information for enabling the viewer to (i) learn more about the property offered for sale, and/or (ii) submit an offer to purchase the item.

As described in greater detail, one implementation provides for components of system 100 to enable bidders to present contingent based offers to purchase a real estate asset of a given listing 105. In variations, components of system 100 enable bidders to make offers for other types of real-estate interests, such as leases or rentals. For example, the bids can specify value, as well as terms or conditions which the seller can accept or decline. The additional terms can thus be an example of contingencies, which can be resolved by the seller's acceptance or counterproposal (and bidder acceptance). Additionally, other contingencies can include actions or events obtained through third-parties, such as a credit check of bidder, or property inspection by the bidder. Thus, in an example of FIG. 1, the interested party can be a prospective tenant, and the "bid" can include lease terms.

While some scenarios described with FIG. 1 make specific reference to real-estate, examples described herein can extend to other types of items and transfers. With regard to transactions, prospective acquiring or purchasing parties can submit bids, offers, or proposals, in which conditions or conditional terms of the transaction can be deemed as contingencies.

According to examples as described, the condition or terms (sometimes referred to collectively as "contingencies") which accompany an offer from an interested party (sometimes referred to as "bidder") can be quantified and represented numerically as a score, as a multi-dimensional parameter (e.g., vector), and/or as a stratification (e.g., "good", "fair" or "bad"). Among other benefits or technical affect, the quantification of contingencies can enable (i) offers to be compared against other offers on the basis of the contingencies (as well as transaction values), (ii) offers to be compared against seller preferences in order to rank bids and/or predict outcome of bids, based on transaction value and accompanying contingencies, and/or (iii) use of predictive models and algorithms to evaluate bids on an ongoing basis through the duration of an offer/proposal acceptance period.

In some variations an example of FIG. 1 provides that contingent terms of individual offers are communicated to the seller and/or other bidders or persons having interest (e.g., such as published on the online forum 155) using quantitative based expressions that strip personal and demographic information from a bidder's offer 101 and the associated contingencies 103. Some examples of FIG. 1 recognize that bidder information, and/or specific information accompanying the contingencies of the bidder offer (e.g., loan type or lender) can lead to subjective or even prejudicial judgment on the part of the seller or seller representative. Some examples further recognize that conventional approaches for offer evaluation (with contingencies) over-rely on subjective judgment and perspective, often on the part of the seller or seller representative and with respect to individual bidders. An example of FIG. 1 recognizes that this judgment can be inaccurate and unreliable, resulting in inefficiency in the transaction. For example, a bidder with 25% cash payment (75% loan contingency) may be viewed unfavorably by the seller to the "certain" all cash offer, even though the 25% cash offer would provide the seller with a higher amount. The inefficient decision of the seller may be the result of the seller's unfounded fear of the loan contingency. Under an example of FIG. 1, the seller would be able to compare the contingencies accompanying individual offers using a qualitative metric which can enable comparison of contingencies between offers. As described in greater detail, the metrics can correlate to a likelihood that any specified contingencies which accompany an offer would clear (or resolve in favor of the transaction) should the offer be accepted by the seller.

In operation, a seller can interact with seller interface 110 in order to provide asset information 121 for a real estate asset. The asset information 121 can specify various information necessary for generating or listing a real estate asset, including information that identifies the real estate asset (e.g. street address and or parcel number, county, state), type of real estate, descriptors of the real state (e.g., square footage of lot, square footage of house, number of bedrooms, number bathrooms, etc.), legal name of title holder, identification of all mortgages and/or lien holders for the property, state of title for the property, occupancy status of the property, and numerous other information items. The seller can also interact with the seller interface 110 in order to include content to entice and inform potential buyers, such as images of the real property asset with accompanying text description. Additionally, the seller can use the seller interface 110 to specify a reserve price, as well as required terms and conditions for the transaction, and/or other conditions for the transaction of the real estate asset.

In some variations, the seller can also specify (e.g., through the seller interface 110) preferences for contingencies (shown as "preferences 123"), such as terms of purchase, closing, approval, financing contingencies, leaseholder contingencies etc. The type of contingencies which may be provided through the seller interface 110 for selection by the seller can be determined from the transaction or type of item being transacted. In some implementations, the seller interface 110 includes features which enable the seller interface 110 to structure how the seller specifies the preferences, so that the contingency input from the seller can be normalized for a quantitative metric. For example, in a residential property, the preferences 123 can be structured to identify the seller's preference for percentage down, the number of days closing, and/or the appraisal value. In a lease, the seller interface 110 can enable the seller to include deposit amounts, conditions for inspection, additional amenities for lease, term of lease, etc. In this way, the seller interface 110 can be structured so that the terms or conditions of the preferences 123 are normalized, with like conditions or terms ranging between common low and high values (e.g., "0" and "1") and provided using a common basis or unit of measurement.

In an example of FIG. 1, the asset information 121 can be communicated to the listing component 150, which can operate as part of a corresponding service or subsystem. In such an implementation, listing component 150 can include or access functionality which can verify seller information, such as programmatically implemented workflows which require the seller to perform steps to be authenticated as owner or otherwise have authority to sell the property. In some applications or variations, seller interface 110 can be operated by a financial institution or other financially interested party. The listing component 150 can generate listing content 151 from the asset information 121. The listing content 151 can be output onto the online forum 155 for viewing by prospective bidders and interested parties.

The transaction manager 144 can implement a transaction process of a particular type or kind. The process implemented by the transaction manager 144 can be selected by implementation and/or design. For example, the transaction process implemented by transaction manager 144 can be selected for a website or service where the online forum 155 is provided. In one example, transaction manager 144 implements an auction process for an auction website, in accordance with one or more auction rules. By way of example, the transaction manager can implement auction rules which enable specification (by the seller) of reserve price parameters, as well as host rules such as auction extensions for last-minute offer submissions (e.g., auction extended by one minute when bid is received in the last minute). In variations, alternative forums for receiving offer submission can be implemented with alternative publication rules. For example, the online forum 155 can be operated by ranking bidders by transaction value and/or by meeting contingency preferences of the seller. Bidders can be ranked or sorted with or without publication of the transaction values (e.g., blind offer submission). In such variations, individual offers can be represented in the online forum 155 by one or more parameters which quantify, for example, (i) the offer value in relation to a seller reserve, or other offers (e.g., predictive), (ii) a predictive outcome of the contingencies specified by the bidder, meaning the likelihood that the contingencies of the bid will resolve in favor of the transaction being completed should the corresponding bid be accepted, (iii) a quantified comparison of the contingencies accompanying a bid with those of other bids for the same item, (iv) a quantified comparison of the contingencies accompanying a bid with a corresponding set of seller preferences 123, and/or (v) predictive scoring or measurement which take into account a bid value and bidder contingencies.

In some examples, transaction manager 144 can specify a duration for which the transaction is to take place, including a duration for when offers can be received, and/or a point in time (or timing condition) after which no further offers can be received from bidders. In an example of FIG. 1, the transaction manager 144 can signal completion 147 of the bid submission for a given real property asset. The completion signal 147 can be generated in response to a timer or timing logic indicating that the duration has been completed. After the completion signal 147 is provided, no further bids can be received for the real estate asset of the transaction.

The transaction manager 144 can implement logic to enforce rules of the transaction process. For example, the transaction manager 144 can enforce logic to deny, ignore or otherwise preclude receipt or seller consideration of offers which come in after a point in time when bidding intake has been deemed terminated (e.g., and offers previously submitted are being evaluated). As an addition or alternative, transaction manager 144 can also implement one or more rules for how an offer is selected by the seller. For example, in one implementation, once the duration for receiving offers has been completed, the transaction manager 144 can programmatically aggregate the bids 101, and then communicate the bids 101 (along with information that is indicative of the likelihood that the contingencies of the respective offers would favorably resolve) for presentation and manual selection by the seller. In variations, the seller can programmatically accept a bid 101 which includes a highest bid value 99, subject to some threshold evaluation of the contingencies 103 associated with the offer. For example, as described below with various examples, the contingencies 103 of individual bids can be quantified into a score or other metric, and a transaction manager 144 may accept the bid with the highest bid value 99 subject to the score or metric representation of the contingencies 103 which accompany the offer satisfying a predetermined minimum threshold.

According to some embodiments, offer interface 120 receives various forms of information from individual bidders who participate in the transaction process for a given real estate asset provided on the online forum 155. As with seller interface 110, offer interface 120 can be in the form of a webpage, web-based application interface or other interface for a network computing environment. Prospective bidders can utilize the offer interface 120 to specify bidder information in regards to, for example, real-estate assets. In some examples, offer interface 120 prompts, or otherwise guides the individual bidder to provide information that can include an offer value 99, as well as the set of contingencies 103 that accompany the offer 101. Additionally, the offer 101 can include or may be associated with profile information about the bidder ("bidder information 105"). By way of example, the bidder information 105 can include information of interest to a lender, such as the annual income of the bidder, or the bidder's credit score. The contingencies 103 can include, for example, (i) a percentage of purchase price that is being offered as cash versus loan (or whether bidder is providing all cash offer); (ii) earnest money down; (iii) milestones of the closing process, including duration; (iv) loan type or lender information; (v) estimated valuation of the real estate asset; and/or (vi) the bidder's ability to obtain financing. The type of contingencies 103 can vary depending on the asset type, such as whether the asset is residential or commercial real-estate, a legal title or other right (e.g., lease). The bidder can also specify additional contingencies 103, either through text or through selection of menu items. For example, the bidder can specify that a contingency includes the passage of a termite inspection, or removal of current occupants of the property.

The contingency parameter determination component 132 receives the bid 101, including the transaction value 99, contingencies 103, and bidder information 105, and then implements one or more processes for generating an offer and/or bid representation 135 (s) on behalf of the bidder. The bid representation 135 can include a transaction value 133 (e.g., price specified for item) and one or more contingency parameters 137. The contingency parameters 137 provide a quantified representation of the contingencies 103 of the bid 101. As described with examples, the contingency parameter(s) 137 can be single or multi-dimensional. The bid representation 135 can provide the one or more contingency parameters 137 in normalized form (e.g., based on contingency type) so that the contingency parameters 137 are comparable with one another.

In some examples, the contingency parameter determination component 132 can be implemented with logic ("contingency prediction component 134") to provide the contingency parameters 137 as a predictive outcome determination for the individual bids 101 based on the combination of transaction value 99 and contingencies 103. As described in greater detail, in one implementation, the contingency prediction component 134 can determine the contingency parameters 137 as a predictor of whether the set of contingencies 103 which accompany the individual bids 101 will resolve favorably (for completing the transaction) if the offer is accepted on the basis of the transaction value 99. In a variation, the contingency prediction component 134 can determine the contingency parameters 137 as a predictor of whether the set of contingencies 103 which accompany the individual bids 101 will be acceptable to the seller, or alternatively, weight in favor of the seller accepting the bid 101.

Still further, the contingency parameter determination component 132 can include logic ("contingency comparison component 136") to enable (i) the contingency parameters 137 accompanying the bids 101 of multiple bidders to be compared amongst each other, and/or (ii) the contingency parameters 137 accompanying individual bids to be compared against the set of seller preferences 123. The contingency comparison component 136 can score or rank bids based on a result of either comparing contingency parameters 137 amongst competing bids 101, or as a result of comparing the contingency parameters 137 accompanying individual bids to the set of seller preferences 121.

The publication component 130 can output a set of values which correspond to the transaction value 133 and contingency parameters 137 (collectively the "bid representation 135"). Multiple variations can exist as to how the bid representation 135 is displayed. For example, the online forum can display bid representation 135 with bidder identification and/or other bidder information 105, with ranking (e.g., based on likelihood of success or seller acceptance) or sorting provided by the transaction value 133 and/or contingency parameters 137.

In other variations, the bid representation 135 can be generated to mask bidder identification and/or bidder profiling. In context of certain kinds of transactions, embodiments recognize that under conventional approaches, the contingencies specified by the bidder can inject uncertainty into the transaction, as contingencies can provide a source of information from which a seller can make an inaccurate conclusion or inference about the bidder. For example, when contingencies and personal information about bidders are presented to sellers, many times sellers (or seller representatives) draw inaccurate conclusions and assumptions about the bidder, particularly as to the reliability of the contingencies that accompany the bidder offer. In contrast, some variations of FIG. 1 provide that the bidder's offer 101 (and accompanying contingencies 103) is formulated and published (as bid representation 135) for seller and/or other bidders with minimal information, other than information that is relevant for valuation of the offer and the contingencies. In this way, the bid representation 135 is a quantified metric form of the bid 101 and contingencies 103, which enables the bid to be both objective and normalized for comparison with other offers and contingencies. Moreover, the quantified form of bid representation 135 promotes a more efficient resolution to the real estate transaction, particularly with respect to online forums, as offers and contingencies can be compared without subjective manipulation by the seller or seller representative.

According to one example, the publication component 130 includes masking logic 138 which masks identifiable information from the bid representation 135 in order to generate a masked offer dataset 139. The masking logic 138 can perform actions of filtering, parsing, and text substitution in order to eliminate or replace various types of bidder information which can be specific to class, race, demographic, financial status, etc. The masking logic 138 can generate the masked offer data set 139 to provide or represent the transaction value 133 and the contingency parameters 137 in a manner that masks the characteristics, profile (e.g., demographic class) or identity of the bidder from the other bidders of the online forum 155. The masking logic 138 can also conceal bidder identity, as well as bidder profile information which may otherwise be inferred from the contingencies 103 of the corresponding offer 101. In some variations, the masking logic 138 can generate a masked offer dataset 139. The masked offer dataset 139 can present the bidder information, including the offer and contingencies, as generic non-demographic data that eliminates perception of demographic classification or category associated with the bidder. For example, the masked dataset 139 can preclude perception of bidder economic class, wealth or financial status. In this way, the masked offer dataset 139 can filter, mask or otherwise preclude visibility of information that may result in the seller or seller representative drawing inferences or conclusions as to the quality or reliability of an offer based on the accompanying contingencies (which would be typical with real estate transactions).

According to one embodiment, the contingency determination component 132 can generate contingency parameters 137 which provide a quantification or metric that reflects the likelihood that the set of contingencies 103 which accompany the offer 101 would resolve in favor of completing the transaction if the offer of the bidder is accepted. In a variation, the contingency parameters 137 can provide a quantification or metric that reflects a correlation to seller preferences 123 for contingencies. As mentioned, the contingency comparison component 136 can analyze the contingency parameters 137 correlation between bidder-specified contingencies and seller preferences 123. An output of the contingency parameters 137 can factor in, for example, a priority or ranking scheme of the seller, a distance metric and/or other parameters. In this form, the contingency parameters 137 can provide an indicator of the likelihood that the contingencies 103 of the bid will be acceptable or preferred to the seller so as to improve the chance that the bid 101 will be accepted.

In one implementation, the contingency determination component 132 can determine to contingency parameters 137 to correspond to a single dimensional value (e.g., score from 1 to 100). In some variations, the contingency determination component 132 can normalize the contingency parameters 137, and/or set the contingency parameters 137 to a given range which is specific to the contingency type. In other variations, the contingency parameters 137 can correspond to a label or designation, such as letter grade, or "Good", "Fair" or "Poor". In variations, the contingency parameters 137 can correspond to a multi-dimensional variable which represents a proximity between a bidder set of contingencies and a set of seller preferences.

Among other benefits, some implementations provide that the contingency prediction component 134 implements processes which determine the likelihood that the contingencies 103 accompanying the offer 101 will resolve in favor of the transaction being completed if the offer is accepted. The contingency prediction component 134 can utilize various data sources in making a predictive determination of whether the contingencies will favorably resolve. In one implementation, contingency prediction component 134 can use one or more historical transaction sources 111 for information about prior transactions and contingencies that were approved or favorably resolved. As an addition or alternative, the contingency prediction component 134 can access one or more published lender libraries 113, which can list, for example, lending and/or government requirements for receiving secured loans or mortgages from individual lenders. In real-estate, lender requirements themselves can be computational and complex in nature, given many loans require federally mandated approval requirements which can be difficult to ascertain, particularly when the bidder is near or close to the approval/disapproval cut-off.

Still further, in some examples, a contingency data store 115 can include resources for determining information items which are needed or used to facilitate determination of metrics such as the likelihood that the contingencies 103 will favorably resolve. The contingency data store 115 can, for example, include information for enabling the determination of valuations for assets of like kind as that which is the subject of the transaction. In the context of real-estate, for example, the comparison of real-property assets, to facilitate, for example, a determination of whether a lender will agree to a loan to value ratio which is promoted by the borrower. Still further, the contingency data store 115 can include or otherwise access public and/or proprietary information about contingency approvals. The contingency data store 115 can include rules, parameters or data which is gathered from, for example, expert input, and/or monitoring and observation of past transactions.

By way of example, the transaction sources 111 for real-estate transactions can include (i) a list of transactions which were (in a recent time period) processed through the system 100, (ii) county or government listing of transactions, and/or (iii) published third-party information about the transactions. The various transaction sources 111, lending library 113 and/or contingency data store 115 can be filtered or sorted for relevant transactional or lending information, based on criterion that includes bidder information, including the bid 101 and specified parameters of the accompanying contingencies. Other criterion for filtering or selecting information from the transaction sources 111 and/or lending library 113 include characteristics of the real property asset that is being transacted (e.g., dwelling type as residential or commercial, geographic location, occupancy status, size (e.g., lot size) and range of sale price). Connectors 146, 147 and 148 can provide programmatic interfaces as between the offer presentation component 130 and one or more of the transaction sources 111, lending library 113 and/or contingency data store 115.

According to some examples, contingency prediction component 134 processes input signals which include the offer 101, contingencies 103, and other bidder profile information 105 against a formula or model that is developed from transactional information 111 and/or lender information 113. In some variations, a model can be trained from transactional information 111, and tuned for geographic regions and other specifics of the bidder profile 105 and/or real estate asset. A training algorithm, for example, can analyze both successful and unsuccessful contingencies 103 specified with offers from a sample database (such as provided by transactional data store 111). Likewise, information determined from the lending library 113 can weight the models and/or the determinations of the models as applied to the input signals of the current offer 101 and set of accompanying contingencies 103. Still further, contingency resources 115 can be used to predict critical information, such as valuation of the asset, so that, for example, the loan to value ratios specified with the contingencies 103 can be correlated to likely determinations by lenders who may provide approval of one or more of the contingencies of the bidder.

As described, an output of the contingency prediction component 134 can be in the form of a single or multi-dimensional score or parameter. The contingency comparison component 136 can normalize a contingency parametric output between a minimum and maximum value, (such as between zero and one), and then implement comparisons as between parametric values of competing bids and/or seller preferences in order to rank, sort or evaluate (e.g., by overall score or letter grade) individual bids. In some variations, the contingency prediction component 134 can represent the determined score or parameter of the contingencies outcome using a graphical representation, such as color coding, graph representation, iconic representation, letter grading or other format. FIG. 4B provides an example of graphical representations which correlate to quantitative or parametric determinations representing the likelihood that the contingencies 103 of a given offer will favorably resolve if the bidder offer is accepted.

In some variations, offer publication component 130 implements the masking logic 138 for purposes of excluding or concealing personal or demographic information about the bidder from the bid representation 135. According to one aspect, masking logic 138 includes logic to (i) identify and filter out personal information which may accompany the offer and/or contingencies, and (ii) filter or substitute bidder specific information from offer 101 and/or contingency 103, so as to mask specific information which can subjectively (on the part of the seller or seller representative) exclude or work against the bidder. While some examples may provide that the masked data set 139 is limited to include only the transaction value and the contingency parameters 137, variations may provide generic descriptors of, for example, contingencies 103. These descriptors can, for example, specify that the bidder has a national lender and/or superior credit score.

In an example of FIG. 1, the publication component 130 displays the bid representation 135 (or masked data set 139 when masking logic 138 is used) for the online forum 155. In this way, the publication component 130 can display the bid representations 135 (or corresponding masked data sets 139) of competing bidders at one time. For example, the online forum 155 can display multiple bid representations 135 at one time, each bid representation correlating to a bid with contingencies. The bid representation 135 can rank or score the individual bidders using the transaction value 133 and/or the contingency parameters 137 as determined from the bid submission. According to one example, the online forum 155 displays multiple offers in the form of bid representation 155, and each offer which is displayed on the online forum 155 specifies the corresponding transaction value 133 and set of contingency parameters 137. In some variations, the offers can be ranked by transaction value 133 and/or overall appeal, taking into account seller preferences 123 for contingencies, and consideration of whether the offer will close given existing contingencies.

In some implementations, the publication component 130 can display each bid representation 135, and additional logic can be implemented with the forum to determine comparisons between the individual bids 101. The transaction manager 144 can implement controls that signal when the duration for receiving bids is complete. According to one implementation, once complete, the transaction manager 144 can pull 129 or otherwise aggregate the bid representations 135, and further provide information for the seller to make the selection 149 from the group of offers. In making the selection 149, the seller can be provided the contingency parameters 137 in the format of a graphic and/or qualitative representation of the likelihood that the contingencies for the specific offer and bidder will resolve favorably if that offer is accepted by the seller.

In some variations, network computer system 100 can be used to generate feedback 159 to the bidder regarding the bidders offer and/or aspects of the bidders offer. In one implementation, the feedback 159 can display a predictive quantitative measure for the contingencies of the bidders offer, representing the likelihood that the contingencies will resolve favorably for the offer. The user can adjust his contingencies in response to receiving the feedback 159. The feedback 159 can further pinpoint specific aspects of the contingencies in the bidder's offer which could use the most improvement, so as to facilitate the bidder in determining parameters for the contingencies of the offer submission.

As an addition or variation, an offer prediction module 166 can be integrated with the network computer system 100 in order to generate a predictive outcome as to whether a bidder's submission will succeed. In an example of FIG. 1, the offer prediction module 166 can operate on an assumption that bids which include the highest transaction values are favored, provided that the contingencies which accompany such offers are acceptable. Accordingly, offer prediction module 166 compares the transaction value of a given bidder offer to the amounts of other offers (e.g., as listed in the online form 155) in order to compare the bidder's offer with other offers. Moreover, the contingency parameters 137 of the current offer can be compared with the contingency parameters 137 of other offers. The contingency parameters 137 of each offer can share format and structure with other offers. In one implementation, the contingency parameters 137 of each offer can be provided as a normalized score which ranges between a low and high range value. In one implementation, bidder can receive feedback in the form of a prediction as to whether the offer will succeed, based on the contingencies and the offer amount specified by the bidder.

Methodology

Figure 2:
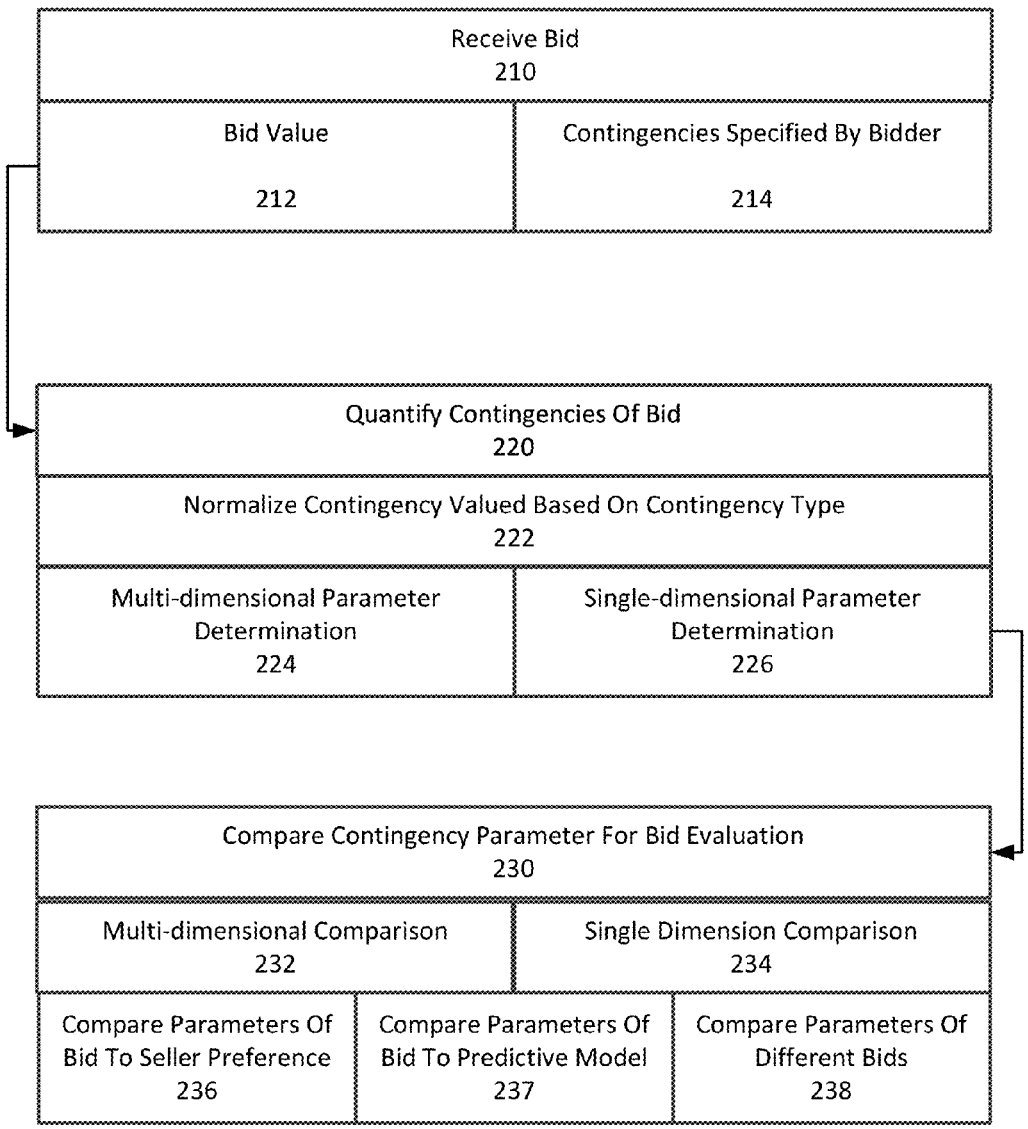
FIG. 2 illustrates a method for evaluating an offer in which contingencies are specified, according to one or more embodiments.

FIG. 2 illustrates a method for evaluating an offer in which contingencies are included, according to one or more embodiments.

Figure 3A:
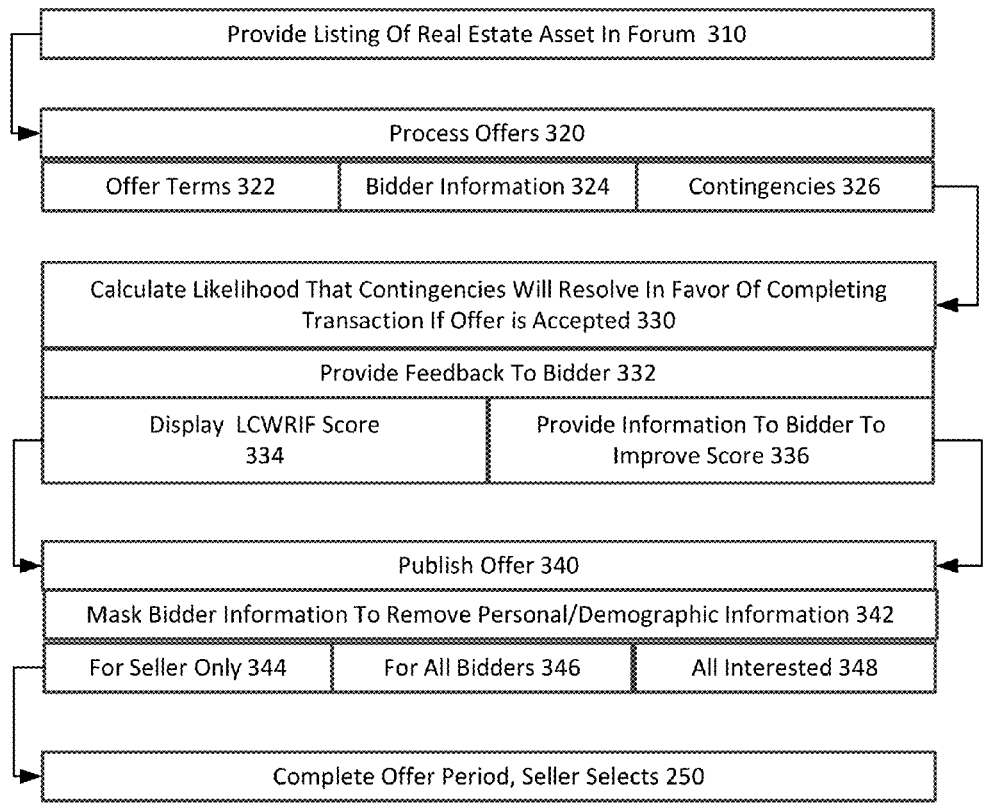
FIG. 3A illustrates an example method for presenting an offer with contingencies for a real estate property, according to one or more embodiments.
Figure 3B:
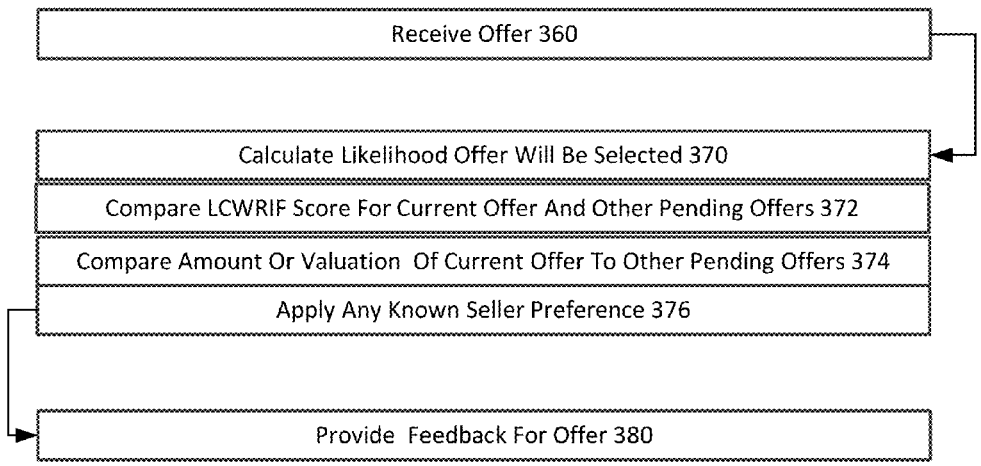
FIG. 3B illustrates an example method for predicting a chance for an offer to succeed, given an offer price and accompanying contingencies, according to one or more embodiments.

FIG. 3A illustrates an example method for presenting an offer with contingencies for a transaction implemented amongst a group of parties for a network computer system, according to one or more embodiments. FIG. 3B illustrates an example method for predicting a likelihood for an offer to succeed, given an offer price and accompanying contingencies, according to one or more embodiments. In describing an example method of FIG. 3A or FIG. 3B, reference may be made to elements of FIG. 1 for purpose of illustrating suitable components for performing operations as described.

With reference to FIG. 2, an offer can be received and processed for an item of a transaction which is the subject of a transaction in an online forum (210). The online forum can correspond to, for example, an auction forum, or an online classified space. The item of the transaction can correspond to, for example, commercial real-estate, residential real-estate, leasehold, timeshare, motor vehicle, a collectible, a consumer electronic device, etc. The offer can be processed to identify a transaction value, meaning the value which the participant would like to pay in exchange for the item of the transaction (212). The offer can also be processed to identify a set of contingencies which the buyer can specify as part of the offer submission (214).

The set of contingencies can be quantified when submitted (220). In one implementation, the bidder is guided by an interface (e.g., see FIG. 4A) to provide a transaction value and a set of contingency parameters which have a range of predefined values. The predefined range can thus normalize the values of the contingency parameters to be within a range of values (222). In variations, the values of the contingency parameters can be implemented by logic (e.g., mapping) so as to convert, for example, terms of the offer into numeric values within a set range. The contingency parameters can be implemented as both single-dimensional values (e.g., scores) and multi-dimensional values which can represent multiple contingencies of the offer submission.

The offer submission can be evaluated based in part on the contingency parameters. In particular, the contingency parameters can be made a basis or point of comparison in order to evaluate the offer submission along with the transaction value of the specified offer. Depending on the application and implementation, the comparison can compare contingent terms of an offer with a corresponding set of seller preferences for the transaction (236). In real-estate transactions, for example, the seller can have multiple preferred contingencies specifying facets such as a duration of the closing period, financing conditions and other terms. When multiple contingencies are present and being compared, a distance formula, for example, can be used to measure the proximity of a given offer's contingencies to that of the seller preference. The comparison can be made as a whole, or on a per contingency basis.

In some variations, the contingency terms of the given offer can be compared to a predictive model or set in order to predict a likelihood of an outcome (237). For example, the predictive model can determine whether a set of contingencies specified with an offer would likely result in the transaction being completed if the offer was accepted. In residential real-estate, for example, a likelihood to close score (or parameter) can predict whether the transaction for the home will close or complete once the transaction is agreed upon by buyer and seller. Contingencies as to financing (e.g., borrower approval) can cause the transaction to not close. In such an example, the contingency parameter can reflect the credit worthiness of the borrower, as well as the financial terms or conditions of the transaction (e.g., down payment too high, transaction price too high).

Still further, the contingency parameters of an offer submission can be compared to contingency terms of the other offers for purpose of ranking or scoring offers and terms against one another (238). The comparison of each offer to a seller preference or predictive model can provide a basis for evaluating one offer as more likely to succeed as compared to another offer.

With reference to an example of FIG. 3A, a network computer system 100 can provide a listing of an asset for transaction (e.g., residential or commercial real property) in an online forum (310). The online forum can correspond to, for example, an auction site and/or listing service for assets such as real-property, fine art and collectibles, automobiles and transport vehicles, apparel, electronics etc. In some variations, the asset corresponds to a lease, such as for a real-estate dwelling.

The network computer system 100 can operate to initiate a duration of time during which bidders can submit offers for the listing (320). The duration of time can be set by transaction rules, managed under rules/logic of the service on which the listing is provided (e.g., under auction rules, provided by an auction service or website). The offers can be processed to identify offer terms (e.g., amount, deferred amount, rent back etc.) (322); bidder information (e.g., credit worthiness of bidder, current demographic and or income information of bidder) (324); and/or contingencies (e.g., percentage of sale price being provided in cash versus loan, days required for closing, appraisal value of real estate asset, completion of another transaction, such as the bidders current residence) (326). By way of example, the offer interface 120 can include or otherwise integrate with processes for parsing the bidder offer, as well as with features for structuring an input interface to receive contingencies (e.g., in pre-structured form).

The network computer system 100 can predict the likelihood that the contingencies accompanying the offer will resolve in favor of completing the transaction if the offer is accepted (330). For example, contingency prediction component 134 can utilize statistical or learned models (or formulas) in order to calculate the likelihood that the contingencies specified with the offer will resolve favorably. In determining such likelihood, the contingency prediction component 134 can utilize criteria such as the geographic location of the real estate asset (e.g., utilizing transactional data store 111 filtered for location), the credit worthiness of the bidder (e.g., as determined from bidder information 105), and the expected valuation of the real estate asset (e.g., as determined using data from contingency resources 115).

In some variations, the bidder can be provided feedback as to a score or quantitative metric for the contingencies of the bidders offer (332). The feedback can be provided, for example, in advance of the offer/contingencies being published on the online forum 155 (e.g., as masked data set 139) (334). In this way, the feedback can provide the bidder with an opportunity to change one or more of the contingencies of the offer, so as to increase the score or metric which evaluates the contingencies of the bidder. As an addition or variation, the feedback can specify specific aspects of the contingencies and/or offer which the bidder can improve upon in order to raise the score or metric associated with the contingencies of the bidder's offer (336). For example, the contingencies of the bidder's offer can be separated into elements, such as credit worthiness or loan to value ratio, and the bidder can be provided feedback in the form of guidance to improve his or her standing (e.g., increase to value ratio to account for possible appraisal value that is lower than expected).

According to one example, the offer can be published using the amount and a quantitative representation of contingencies accompanying the original offer (340). The published information can be reduced or converted into objective information, such as a quantitative predictive measure reflective of a likelihood of favorable resolution for the contingencies (342). The use of such objective information can mask demographic and/or personal information about the bidder. As explained with other examples, some embodiments recognize that a seller (or seller representative) can rely on subjective formulations of offers and contingencies, which leads to an inaccurate and inefficient result for the bidder and seller. By reducing the presented information to objective form, such counterproductive subjective formulations can be eliminated, or at least mitigated.

In some examples, the bidder's offer submission, having a transaction value 133 and contingency parameters 137 can be communicated to the seller, without disclosure to other bidders (344). In variations, the information from one bidder can be communicated to all bidders, so that a transparent bidding forum is created where individual bidders see both the amount specified by competing offers, and an objective and quantitative prediction of the contingencies of each of the respective offers (346). Still further, the bidder information can be displayed to non-bidders, for purpose of drawing interest into the transaction (348).

In some examples, once an offer period is completed, the seller is given the opportunity to make selection from multiple competing offers. As described with other examples, the seller can use the contingency parameters 137, which reflect a quantitative comparison of one bidder's contingencies with either contingencies of a competing bid and/or with seller preferences. For example, the contingency parameters 137 of a given offer can reflect a comparison of the contingencies provided with the offer with those of other bidders, in order to present comparisons from which the seller can choose from. As an addition or alternative, the comparisons of the contingency parameters 137 can also be to a set of seller preferences 123. This enables the seller to better decide the best offer taking into account both transaction value and contingencies of individual offer submissions, resulting in a more efficient outcome for the transaction conducted by the network computer system 100.

With reference to FIG. 3B, an offer may be received for a real estate asset using the network computer system 100, as described with various other examples (360). According to some embodiments, a likelihood is calculated that the received offer will be selected by the seller (i.e., as the winning offer). In some examples, the calculation can be based on (i) a quantitative metric which represents the likelihood that contingencies specified by the offer will resolve favorably if the offer is selected (370), (ii) a comparison of a quantitative metric which represents the contingencies of the submitted offer, as compared to the quantitative metric for other offers that have been received for the same transaction of the real estate asset, (372) and (iii) a comparison of amounts or valuation of the current offer with the other pending offers (e.g., price or valuation of offers) (374).

In some variations, a seller preference for certain offer terms or contingencies may be made known by seller input. For example, the seller may prefer cash and/or a short closing period. Such preferences may programmatically correlate to offers which have contingencies that exclude lender approval (e.g., all cash offers). Furthermore, such seller preferences can weight the determination of the likelihood that a given offer will be selected either for or against selection, depending on whether the offer is aligned or against the seller preference. In an example of FIG. 1, an offer prediction module 166 can use, as input signals (i) the transaction value of an offer submission, (ii) the determined contingency parameters for that offer, and (iii) a comparison of the transaction values and corresponding contingency parameters 137 of the competing offers, as recorded by, for example, online forum 155. The comparison can also rank the contingency parameters based on predictive determinations which reflect, for example a degree or measure of preference by the seller for contingency terms of a given offer as compared to other offers. Such comparisons and predictive determinations can generate a likelihood that a given offer amount, along with specified contingencies, can result in the offer being successful. In some variations, system 100 (e.g., offer prediction module 166) can generate feedback for a given bidder who is interested in making an offer. For example, the bidder can generate a sample offer, along with a set of contingencies, and utilize the offer prediction module 166 to receive feedback in the form of a likelihood score of whether the particular offer to succeed. The feedback can optionally be provided in advance of the offer of the bidder being submitted. Thus, the feedback can be provided in advance of the bidder providing a formal offer for consideration.

EXAMPLES

Figure 4A:
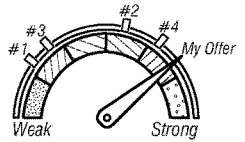
FIG. 4A illustrates an example of an online listing for a real state property in which a bidder is provided a template for defining an offer with a set of contingencies.

FIG. 4A illustrates an offer interface for enabling a bidder to make a bid submission for a transaction conducted online, according to one or more examples. FIG. 4B illustrates an example feedback interface that a user can receive for a listing, where the example indicates a likelihood for each of the bidder's offer and bidder's contingencies. As described herein, examples of FIG. 4A and FIG. 4B can be implemented using components or functionality such as described with an example of FIG. 1. Accordingly, reference may be made to elements of FIG. 1 in order to illustrate suitable components or functionality for implementing examples as described.

In FIG. 4A, offer interface 410 includes content that describes a real estate property (e.g., commercial building). A listing price can be advertised with the listing. In an auction environment, the listing may be associated with a hidden reserve price. The offer interface can include a form 410 which the bidder can complete in order to submit an offer with a set of contingencies. In an example of FIG. 4A, offer terms and contingencies can be associated with visual markers that indicate a corresponding chance of success. FIG. 4A illustrates, for example, a predefined set of input features which prompt a user to enter input relating to a preselected contingency. In an example of FIG. 4A, the contingencies of an offer for a commercial real-estate item can include earnest money down ("EMD") percentage, diligence period, diligence contingency, escrow period, loan contingency and "other" loan contingencies. In residential real-estate, contingencies can include appraisal amount, financing approval, percentage down, closing period, title and inspection.

As another example, an offer interface can be implemented similar to an example of FIG. 4A, in which the participant making the offer can specify, for example, offer terms for a leasehold. More specifically, an offer interface can be provided to prompt or otherwise guide the user into providing the offer term. For example, in the case of a leasehold, the transaction value, term, deposit amount, amenities, tenant credit check shown with the offer interface 400 can be used to implement an offer submission for a leasehold. Extending further, when automobiles are considered, the transfer of the vehicle may be subject to, for example, buyer or third party vehicle inspection, title transfer, mechanical inspection, shipping rate, etc.

FIG. 4A further illustrates an implementation in which the offer interface 400 includes feedback to assist the participant into tuning aspects of the offer under creation, including the offer amount and/or the set of contingencies. The feedback can be, for example, visual aided, to reflect a strength of individual aspects of an offer (e.g., transaction amount, contingencies, etc.). The indication of the strength of the aspect can be based on, for example, a comparison of other offer submissions for the same item of transaction, or alternatively, based on seller specific preferences or historical values.

With reference to an example of FIG. 4A, the offer interface 400 can include features to structure the bidder input which specifies the contingencies. Additionally, the fields can prompt a bidder to enter normalized input for the contingency parameters. For example, contingency parameters for diligence and loan can have a range of (0, 1), meaning the contingencies have been specified. A term of the offer can be deemed likely to be successful based on a determination as to whether the offer is acceptable over other offers. Thus, the success metrics associated with an offer indicate whether the term as a whole is likely to succeed given the metric specified (e.g. offer price).

A contingency in the offer can be deemed likely to succeed if the contingency will likely resolve favorably for the offer, under the premise of the offer will be accepted. The contingency may be decided by sources other than the bidder or seller, such as the lender for the bidder who is providing the funds for the transaction. In an example of FIG. 4B, contingency terms can include a closing or diligence period, an escrow period, whether a loan contingency is present, and various other conditional metrics.

In some examples, an interface (or form) 410 provided with a listing 400 for purpose of enabling the participant to submit offers can also display prediction information as to the likelihood of success for offers of other bidders. In an example of FIG. 4B, likelihood of success can factor in transaction value and how closely offer submissions match seller preferences. Some variations provide that the prediction information can also evaluate the contingencies of the other offers, so that the participant can visually compare the participant's set of contingencies with those of other participants.

In FIG. 4B, a feedback interface 420 is shown, indicating a likelihood of success for a given participant's offer submission. In an example shown, different aspects of the offer indicate a strength or weakness of the aspect with respect to improving or weakening the overall offer submission. The summation of the offer interface can be based in part on the transaction value and the seller preferences. The likelihood of success can be color-coded to reflect which offers have the best chance of succeeding. Additional indicators can be provided as to whether the other offers have (or not have) contingencies which are likely to resolve in favor of the transaction.

Computer System

Figure 5:
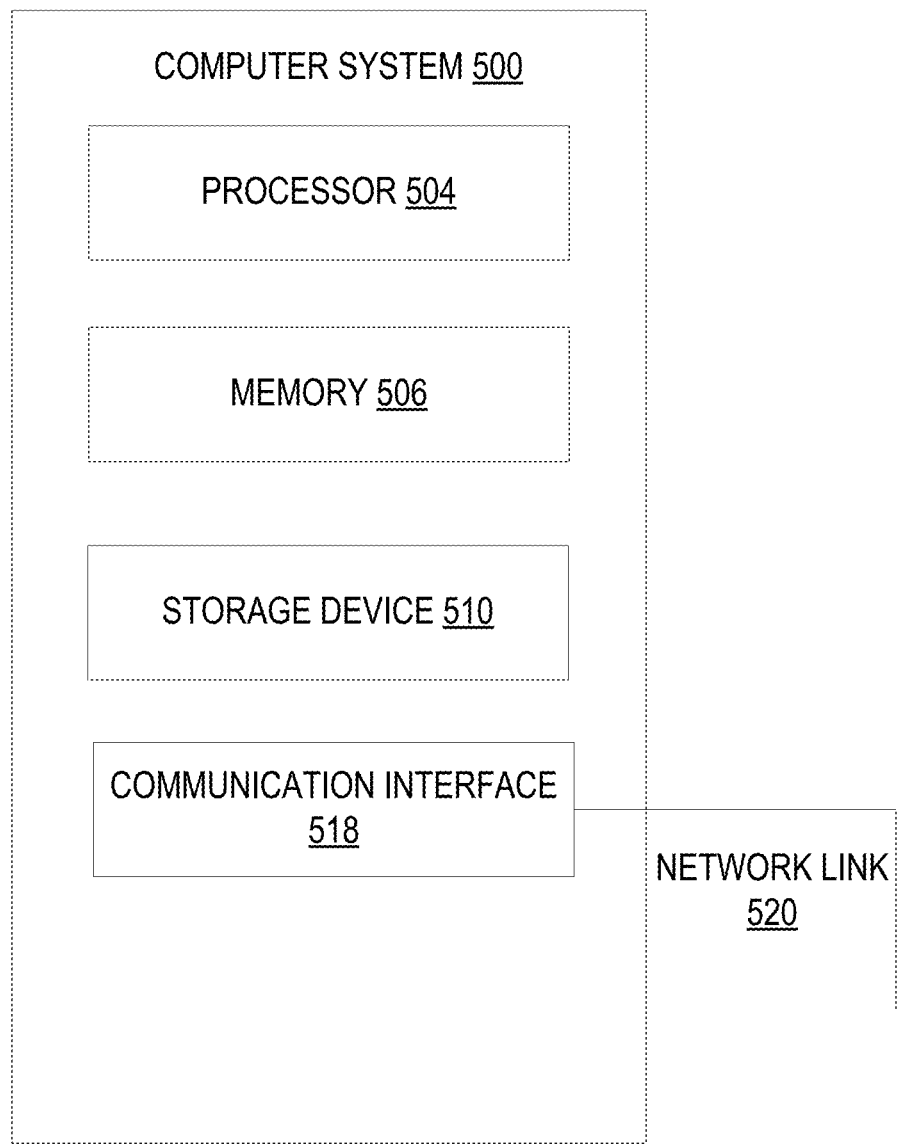
FIG. 5 is a block diagram that illustrates a computer system upon which examples described herein may be implemented.

FIG. 5 is a block diagram that illustrates a computer system upon which embodiments described herein may be implemented. For example, in the context of FIG. 1, system 100 may be implemented using one or more servers such as described by FIG. 5. Likewise, a method such as described with FIG. 2, FIG. 3A or FIG. 3B can be implemented using, for example, a computer system such as described with FIG. 5.

In an embodiment, computer system 500 includes processor 504, memory 506 (including non-transitory memory), storage device 510, and communication interface 518. Computer system 500 includes at least one processor 504 for processing information. Computer system 500 also includes the main memory 506, such as a random access memory (RAM) or other dynamic storage device, for storing information and instructions to be executed by processor 504. The memory 506 also may be used for storing temporary variables or other intermediate information during execution of instructions to be executed by processor 504. The memory 506 may also include a read only memory (ROM) or other static storage device for storing static information and instructions for processor 504. The storage device 510, such as a magnetic disk or optical disk, is provided for storing information and instructions. The communication interface 518 may enable the computer system 500 to communicate with one or more networks through use of the network link 520 and any one of a number of well-known transfer protocols (e.g., Hypertext Transfer Protocol (HTTP)). Examples of networks include a local area network (LAN), a wide area network (WAN), the Internet, mobile telephone networks, Plain Old Telephone Service (POTS) networks, and wireless data networks (e.g., WiFi and WiMax networks).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is claimed is:

1. A computer system comprising:
   a set of memory resources to store a set of instructions;
   one or more processors to execute the set of instructions to cause the computer system to:
   cause a bidder interface to be provided on a remote device to receive input data corresponding to an offer for a property for sale on an online marketplace from a user of the remote device, the input data indicating an offer value and a set of contingencies, wherein the set of contingencies specify a set of contemporaneous or future events for which an outcome is uncertain;
   prior to submitting the offer for the property to a seller of the property for consideration, determine (i) a set of contingency parameters for the offer, each of the set of contingency parameters being associated with a quantified strength of a corresponding contingency in the set of contingencies and (ii) a multi-dimensional offer parameter based at least on the offer value and the set of contingency parameters;
   prior to submitting the offer for the property to the seller of the property for consideration, cause the bidder interface to display a plurality of user interface elements, the plurality of user interface elements comprising at least:
      (i) a first user interface element configured to display a first visual representation, the first visual representation being a quantified representation of the multi-dimensional offer parameter; and,
      (ii) at least one second user interface element configured to display a second visual representation, the second visual representation being a representation of the associated quantified strength of a corresponding one of the set of contingency parameters;
   receive, via the bidder interface, additional input data, the additional input data corresponding to updates to the offer and indicating one or more adjustments to at least one contingency parameter of a respective contingency; and
   in response to receiving the additional input data, dynamically update the bidder interface without navigating away from the bidder interface by (i) updating the first user interface element to include an updated first visual representation including an updated quantified representation of the multi-dimensional offer parameter and (ii) updating the at least one second user interface element to include an updated second visual representation including an updated quantified strength of the corresponding adjusted contingency parameter.

2. The computer system of claim 1, wherein the offer specifies multiple contingencies, and wherein the executed instructions cause the computer system to determine multiple contingency parameters for the set of contingencies.

3. The computer system of claim 1, wherein the executed instructions cause the computer system to evaluate the offer based on a comparison of the set of contingency parameters with a corresponding set of seller preferences.

4. The computer system of claim 3, wherein the executed instructions further cause the computer system to evaluate the offer based on a comparison of the set of contingency parameters with a corresponding set of contingencies of one or more other competing offers for the property.

5. The computer system of claim 1, wherein the executed instructions further cause the computer system to evaluate the offer by ranking or comparatively scoring the offer to one or more other offers for the property, based at least in part on a comparison of the set of contingency parameters and a corresponding set of seller preferences.

6. The computer system of claim 1, wherein the executed instructions further cause the computer system to evaluate the offer by ranking or scoring the offer based at least in part on a transaction value of the offer and a comparison of the set of contingency parameters and a corresponding set of seller preferences.

7. The computer system of claim 1, wherein the executed instructions further cause the computer system to process an expressed contingency with the offer and convert the expressed contingency to the quantified representation.

8. The computer system of claim 1, wherein the executed instructions further cause the computer system to provide an offer interface which structures an input data to reflect a quantified representation of one or more contingencies.

9. The computer system of claim 1, wherein the property for sale corresponds to a real-estate item, and individual facets of the offer include financial conditions and inspection conditions.

10. The computer system of claim 1, wherein the property for sale corresponds to a real-estate item, and individual facets of the offer include a lease term and a monthly lease value.

11. A method for providing a bidder interface for an online marketplace, the method being implemented by a network system and comprising:
   cause a bidder interface to be provided on a remote device to receive input data corresponding to an offer for a property for sale on an online marketplace from a user of the remote device, the input data indicating an offer value and a set of contingencies, wherein the set of contingencies specify a set of contemporaneous or future events for which an outcome is uncertain;
   prior to submitting the offer for the property to a seller of the property for consideration, determining (i) a set of contingency parameters for the offer, each of the set of contingency parameters being associated a quantified strength of a corresponding contingency in the set of contingencies and (ii) a multi-dimensional offer parameter based at least on the offer value and the set of contingency parameters;
   prior to submitting the offer for the property to the seller of the property for consideration, causing the bidder interface to display a plurality of user interface elements, the plurality of user interface elements comprising at least:
      (i) a first user interface element configured to display a first visual representation, the first visual representation being a quantified representation of the multi-dimensional offer parameter; and
      (ii) at least one second user interface element configured to display a second visual representation of a corresponding one of the set of contingency parameters;
   receiving, via the bidder interface, additional input data, the additional input data corresponding to updates to the offer and indicating one or more adjustments to at least one contingency parameter of a respective contingency; and in response to receiving the additional input data, dynamically update the bidder interface without navigating away from the bidder interface by (i) updating the first user interface element to include an updated first visual representation including an updated quantified representation of the multi-dimensional offer parameter and (ii) updating the at least one second user interface element to include an updated second visual representation including an updated quantified strength of the corresponding adjusted contingency parameter.

12. The method of claim 11, wherein the offer specifies multiple contingencies, and wherein the network system determines multiple contingency parameters for the set of contingencies.

13. The method of claim 11, further comprising evaluating the offer based on a comparison of the set of contingency parameters with a corresponding set of seller preferences.

14. The method of claim 13, further comprising evaluating the offer based on a comparison of the set of contingency parameters with a corresponding set of contingencies of one or more other competing offers for the property.

15. The method of claim 11, further comprising evaluating the offer by ranking or comparatively scoring the offer to one or more other offers for the property, based at least in part on a comparison of the set of contingency parameters and a corresponding set of seller preferences.

16. The method of claim 11, further comprising evaluating the offer by ranking or scoring the offer based at least in part on a transaction value of the offer and a comparison of the set of contingency parameters and a corresponding set of seller preferences.

17. The method claim 11, further comprising processing an expressed contingency with the offer and convert the expressed contingency to the quantified representation.

18. The method of claim 11, further comprising providing an offer interface which structures the input data to reflect a quantified representation of one or more contingencies.

19. A non-transitory computer-readable medium that stores instructions, which when executed by one or more processors of a computing device, cause the computing device to perform operations comprising:

causing a bidder interface to be provided on a remote device to receive input data corresponding to an offer for a property for sale on an online marketplace from a user of the remote device, the input data indicating an offer value and a set of contingencies, wherein the set of contingencies specify a set of contemporaneous or future events for which an outcome is uncertain;

prior to submitting the offer for the property to a seller of the property for consideration, determining (i) a set of contingency parameters for the offer, each of the set of contingency parameters being associated with a quantified strength of a corresponding contingency in the set of contingencies and (ii) a multi-dimensional offer parameter based at least on the offer value and the set of contingency parameters;

prior to submitting the offer for the property to the seller of the property for consideration, causing the bidder interface to display a plurality of user interface elements, the plurality of user interface elements comprising at least:
  (i) a first user interface element configured to display a visual first representation, the first visual representation being a quantified representation of the multi-dimensional offer parameter; and,
  (ii) at least one second user interface element configured to display a second visual representation, the second visual representation being a representation of the associated quantified strength of a corresponding one of the set of contingency parameters;

receiving, via the bidder interface, additional input data, the additional input data corresponding to updates to the offer and indicating one or more adjustments to at least one contingency parameter of a respective contingency; and in response to receiving the additional input data, dynamically update the bidder interface without navigating away from the bidder interface by (i) updating the first user interface element to include an updated first visual representation including an updated quantified representation of the multi-dimensional offer parameter and (ii) updating the at least one second user interface element to include an updated second visual representation including an updated quantified strength of the corresponding adjusted contingency parameter.

* * * * *